US010648601B2

(12) United States Patent
Montag et al.

(10) Patent No.: US 10,648,601 B2
(45) Date of Patent: May 12, 2020

(54) QUICK CONNECT SYSTEM FOR A FLUID COUPLING

(71) Applicant: Kohler Co., Kohler, WI (US)

(72) Inventors: Patrick Montag, Columbus, OH (US); Perry Erickson, Sheboygan, WI (US); Shashank Varma, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 972 days.

(21) Appl. No.: 14/704,470

(22) Filed: May 5, 2015

(65) Prior Publication Data

US 2015/0354741 A1 Dec. 10, 2015

Related U.S. Application Data

(60) Provisional application No. 62/010,230, filed on Jun. 10, 2014.

(51) Int. Cl.
| | | |
|---|---|---|
| *F16L 37/086* | (2006.01) | |
| *F16L 21/08* | (2006.01) | |
| *F16L 33/22* | (2006.01) | |
| *F16L 37/127* | (2006.01) | |
| *F16L 37/088* | (2006.01) | |

(52) U.S. Cl.
CPC ......... *F16L 37/088* (2013.01); *F16L 37/0885* (2019.08)

(58) Field of Classification Search
CPC ....... F16L 21/035; F16L 21/08; F16L 33/222; F16L 33/225; F16L 37/084; F16L 37/086; F16L 37/088; F16L 37/138; F16L 37/26; F16L 37/0841; F16L 37/098; F16L 37/0985; F16L 37/0987; Y10S 285/921; Y10T 403/347; Y10T 403/44; F16B 21/10

USPC ................ 285/317, 319, 305, 308, 403, 921
See application file for complete search history.

(56) References Cited

U.S. PATENT DOCUMENTS

| | | | |
|---|---|---|---|
| 659,071 A | 10/1900 | Joseph et al. | |
| 929,067 A | 7/1909 | Williamson | |
| 2,908,744 A | 10/1959 | Bollmeier | |
| 4,452,097 A | 6/1984 | Sunkel | |
| 4,753,458 A | 6/1988 | Case | |
| 4,834,423 A | 5/1989 | DeLand | |
| 4,844,512 A * | 7/1989 | Gahwiler | F16L 37/084 285/275 |
| 5,015,013 A | 5/1991 | Nadin | |
| 5,104,158 A | 4/1992 | Meyer et al. | |
| 5,277,459 A | 1/1994 | Braun | |

(Continued)

FOREIGN PATENT DOCUMENTS

| | | |
|---|---|---|
| CA | 2707779 | 12/2011 |
| CN | 101699122 A | 4/2010 |

(Continued)

OTHER PUBLICATIONS

Chinese Office Action issued in corresponding application No. 201510292052 dated Mar. 1, 2017.

*Primary Examiner* — Amber R Anderson
*Assistant Examiner* — Stacy N Lawson
(74) *Attorney, Agent, or Firm* — Foley & Lardner LLP

(57) ABSTRACT

A quick connect system for a fluid coupling is provided. The system includes a clip having a base extending circumferentially substantially around an axis, a wing extending substantially axially from the base, and a delta-shaped lug extending radially from the wing.

19 Claims, 14 Drawing Sheets

(56) References Cited

U.S. PATENT DOCUMENTS

| | | |
|---|---|---|
| 5,568,946 A | 10/1996 | Jackowski |
| 5,630,628 A | 5/1997 | Mönch |
| 5,799,986 A | 9/1998 | Corbett et al. |
| 5,992,902 A | 11/1999 | Knapp |
| 6,231,089 B1 | 5/2001 | DeCler et al. |
| 6,471,252 B1 | 10/2002 | Moretti et al. |
| 6,543,814 B2 | 4/2003 | Bartholomew |
| 6,679,528 B1 | 1/2004 | Poder |
| 6,684,906 B2 | 2/2004 | Burns et al. |
| 6,692,038 B2 | 2/2004 | Braun |
| 7,810,848 B2 | 10/2010 | Yoshino |
| 8,201,853 B2 | 6/2012 | Tiberghien et al. |
| 8,746,746 B1 | 6/2014 | Schafer |
| 2002/0079697 A1 | 6/2002 | Griffieon |
| 2003/0184089 A1* | 10/2003 | Takayanagi ......... F16L 37/0987 285/319 |
| 2004/0061332 A1* | 4/2004 | Takayanagi ......... F16L 37/0847 285/319 |
| 2004/0066034 A1* | 4/2004 | Takayanagi ......... F16L 3/1226 285/93 |
| 2004/0183295 A1* | 9/2004 | Kasahara ............ F16L 37/0987 285/93 |
| 2005/0258646 A1 | 11/2005 | Gunderson |
| 2005/0272264 A1 | 12/2005 | Doherty |
| 2008/0157525 A1* | 7/2008 | Yoshino ............ F16L 37/0841 285/376 |
| 2008/0246274 A1 | 10/2008 | Feger et al. |
| 2008/0277015 A1 | 11/2008 | Tanaka |
| 2009/0021003 A1 | 1/2009 | Poupore |
| 2012/0068457 A1* | 3/2012 | Pisula, Jr. ......... F16L 37/0982 285/317 |
| 2013/0240048 A1 | 9/2013 | Dankbaar et al. |
| 2015/0084336 A1 | 3/2015 | Brown |

FOREIGN PATENT DOCUMENTS

| | | |
|---|---|---|
| CN | 102434740 A | 5/2012 |
| CN | 203628103 | 6/2014 |
| CN | 103925438 | 1/2017 |
| WO | WO 2008/132446 | 11/2008 |
| WO | WO-2013022356 A1 * | 2/2013 ........ A61M 16/0666 |
| WO | WO2015/106243 | 7/2015 |

* cited by examiner

QUICK CONNECT SYSTEM FOR A FLUID COUPLING

CROSS-REFERENCE TO RELATED PATENT APPLICATIONS

This application claims the benefit of and priority to U.S. Provisional Patent Application No. 62/010,230 filed Jun. 10, 2014, the entirety of which is incorporated by reference herein.

BACKGROUND

The present application relates generally to the field of joints or couplings for a fluid conduit. The present application relates more specifically to a quick connect system for a fluid coupling.

Connecting water lines to a faucet may be difficult, as it is usually done in a dark, confined space under a cabinet. Threaded connections are often over-tightened which may lead to leaks, for example, via over-compression of an o-ring or cracking of the fitting. Conventional quick connectors may require properly aligning the pieces or actuation of small elements, which may be difficult to do under a cabinet. Other quick connectors may be difficult to disassemble, which may make repair or replacement of the faucet difficult. Accordingly, there is a need for an improved quick connector.

SUMMARY

One embodiment relates to a quick connect system for a fluid coupling. The system includes a clip having a base extending circumferentially substantially around an axis, a wing extending substantially axially from the base, and a delta-shaped lug extending radially from the wing. The system may include a second wing extending substantially axially from the base diametrically opposite the first wing, and a second delta-shaped lug extending radially from the second wing, wherein the clip is configured such that the first wing and the second wing can resiliently deflect towards one another. The base of the clip may have a "C" shape defining a central opening and a gap extending radially from the opening through the base. The system may include an axially extending fitting configured to be secured to a fluid conduit, the fitting defining an annular groove, wherein a diameter of the fitting at the annular groove and the base of the clip are configured to allow the fitting to be forced through the gap and be retained in the central opening of the clip. The lug may be oriented such that a narrow end of the lug is proximate the base. The lug may be oriented such that a broad end of the lug is distal the base, and wherein the broad end of the lug extends radially and axially away from the wing so as to define an undercut. The system may include a receiver having a sidewall at least partially defining an axially extending bore and defining an aperture passing radially from the bore through the sidewall, wherein, when the clip is in an installed position, the lug extends at least partially through the aperture.

Another embodiment relates to a quick connect system for a fluid coupling. The system includes an axially extending fitting configured to be secured to a fluid conduit, a receiver, and a clip coupled to the fitting. The receiver includes an end, a sidewall at least partially defining a bore extending axially from the end, and a lip at least partially defining an aperture passing radially from the bore through the sidewall, the lip extending outwardly from the bore toward the end. The clip includes a base, a first wing extending substantially axially from the base, and a first lug extending radially from the first wing, wherein the end of the first lug that is away from the base extends radially and axially away from the first wing so as to define an undercut. When the clip is in an installed position, the first lug extends at least partially through the aperture, and the lip is seated in the undercut. The fitting may include a first end, a second end axially spaced from the first end, and an annular groove located between the first end and the second end; and the base of the clip may define an opening such that the base of the clip is seated in the annular groove. The second end of the fitting may be configured to be secured to the fluid conduit, and wherein the fitting defines a second annular groove between the first groove and the first end; and the system may include a seal seated in the second groove, wherein, when the clip is in the installed position, the seal seals between the fitting and the sidewall. The base of the clip may have a "C" shape extending circumferentially substantially about an axis and defining the opening and a gap extending radially from the opening through the base. The system may include a second wing extending substantially axially from the base diametrically opposite the first wing, and the clip may be configured such that the first wing and the second wing can resiliently deflect radially towards one another. To move the clip from the installed position to an uninstalled position, the clip may be moved axially away from the end to unseat the lip from the undercut, the first and second wings may be deflected radially toward one another such that the lugs are within the bore, and the clip may be moved axially toward the end and out of the receiver. The first lug may include a delta-shape having a narrow end toward the base and a broad end away from the base, and the receiver may include a guide extending from the sidewall into the bore, wherein the guide is configured to rotationally urge the first lug toward the aperture as the clip is moved from an uninstalled position to the installed position.

Another embodiment relates to a faucet having a quick connect system for a fluid coupling. The system includes an axially extending fitting configured to be secured to a fluid conduit, a receiver, and a clip coupled to the fitting. The receiver includes an end; a sidewall at least partially defining a bore extending axially from the end and defining an aperture passing outwardly from the bore through the sidewall; and a guide extending from the sidewall into the bore. The clip includes a base, a first wing extending substantially axially from the base, and a first lug extending radially from the first wing. The guide is configured to rotationally urge the first lug toward the aperture as the clip is moved from an uninstalled position to an installed position. The first lug may include a delta-shape having a narrow end toward the base and a broad end away from the base, and the guide may include a narrow end proximate the end of the receiver and a broader end distal the end of the receiver. The system may include a second wing extending substantially axially from the base radially opposite the first wing, and the clip may be configured such that the first wing and the second wing can resiliently deflect radially towards one another. The receiver may include a second guide extending from the sidewall into the bore, the second guide located radially opposite the first guide, the receiver may define a second aperture radially opposite the first aperture and is configured to receive the second lug when the clip is in the installed position, and the first guide and the second guide may be oriented substantially orthogonally to the first aperture and the second aperture. The end of the first lug that is away from the base may extend radially and axially away from the first wing so as to define an undercut; the sidewall may include a lip that at least partially defines the aperture, the lip extending outwardly from the bore toward the end; and when the clip is in the installed position, the first lug may extend at least partially through the aperture, and the lip may be seated in the undercut. The fitting may have an outer periphery having a first diameter, a recessed body portion having a second diameter less than the first diameter, and an annular groove have a third diameter less than the second diameter; and the base of the clip may be seated in the annular groove such that the first wing extends over the recessed body portion.

The foregoing is a summary and thus, by necessity, contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined by the claims, will become apparent in the detailed description set forth herein and taken in conjunction with the accompanying drawings.

DETAILED DESCRIPTION

Figure 1:
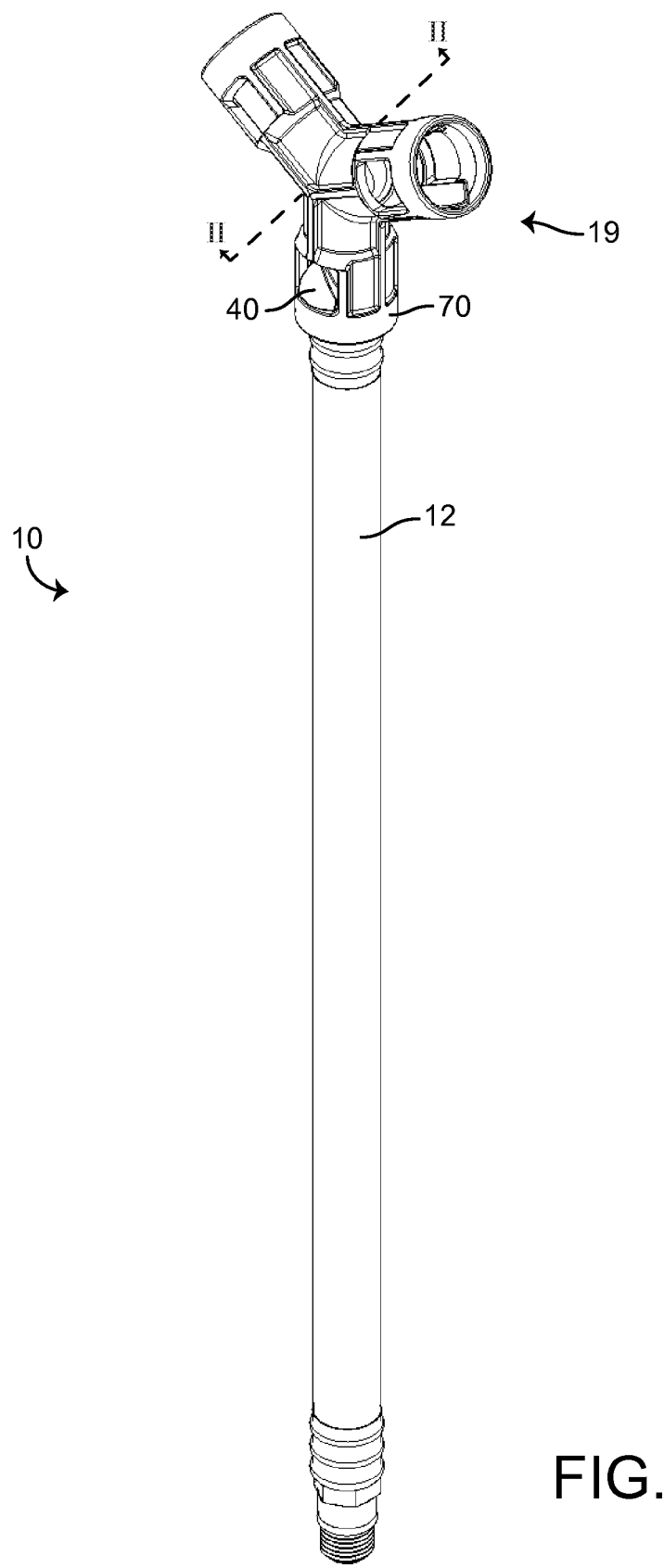
FIG. 1 is a perspective view of a quick connect assembly, shown according to an exemplary embodiment.
Figure 2:
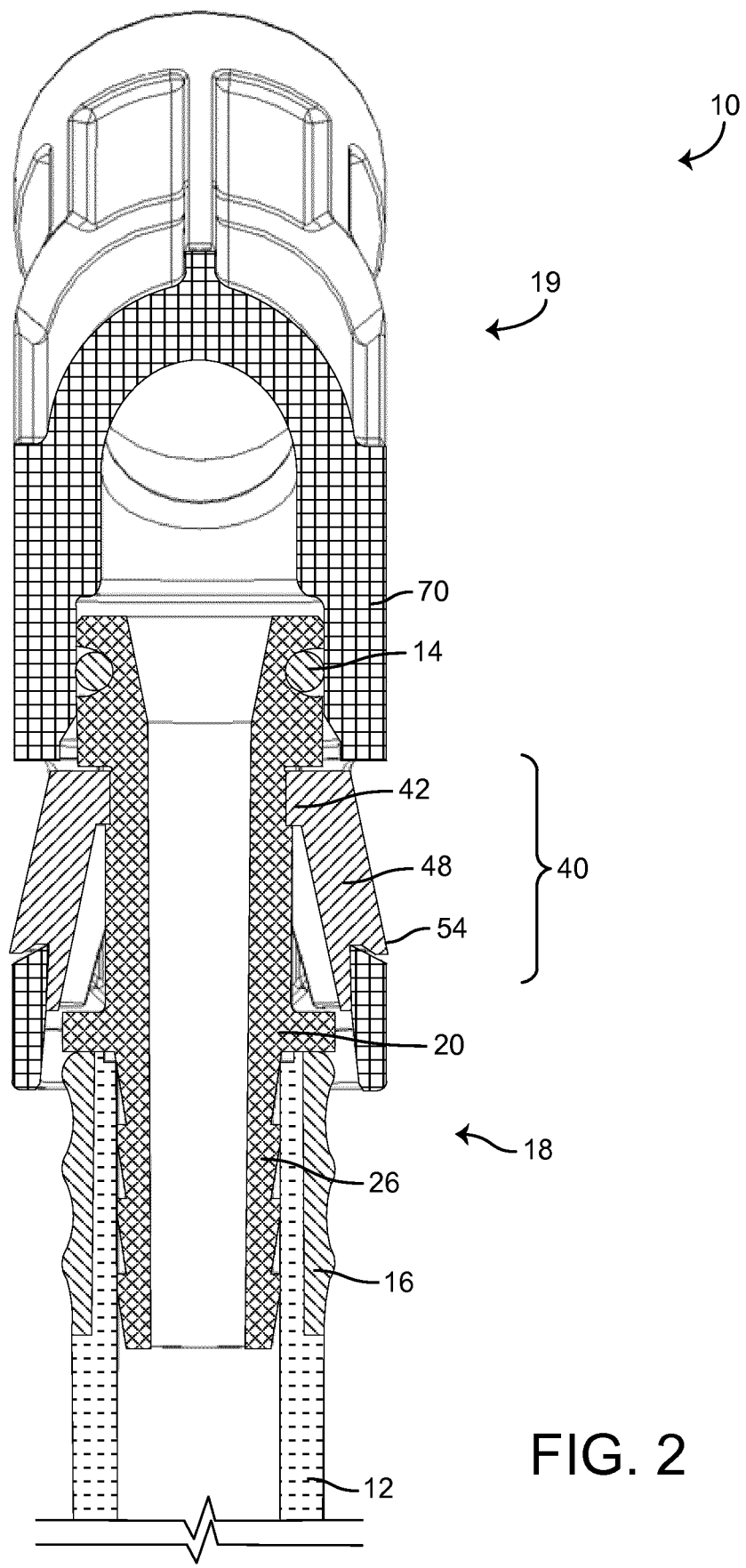
FIG. 2 is a sectional elevation view of the quick connect assembly of FIG. 1, shown according to an exemplary embodiment.

Referring generally to the FIGURES, and particularly to FIGS. 1 and 2, a quick connect assembly 10 and components thereof are shown according to an exemplary embodiment. The quick connect assembly 10 includes a male assembly 18 and a female assembly 19 (shown as a Tee) having a receiver 70. The male assembly 18 includes a fitting 20 secured to a fluid conduit (line, pipe, etc.), shown as a hose 12. A clip 40 is coupled to the fitting 20 and releasably couples the male assembly 18 to the female assembly 19. A seal 14 is coupled to the fitting 20 and seals between the male assembly 18 and the female assembly 19.

When assembled, the fitting 20 and the receiver 70 are connected together such that fluid (e.g., water) may flow from the hose 12 into the receiver 70. Another assembly may be installed into another end of the Tee, thereby providing a sealed fluid pathway from one fluid conduit to another. While the receiver 70 is shown to be a Tee, the receiver may have any number of ends (e.g., a single ended terminal, a two-ended coupling, a four or more ended distributor, etc.).

Before discussing further details of the quick connect assembly and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 3:
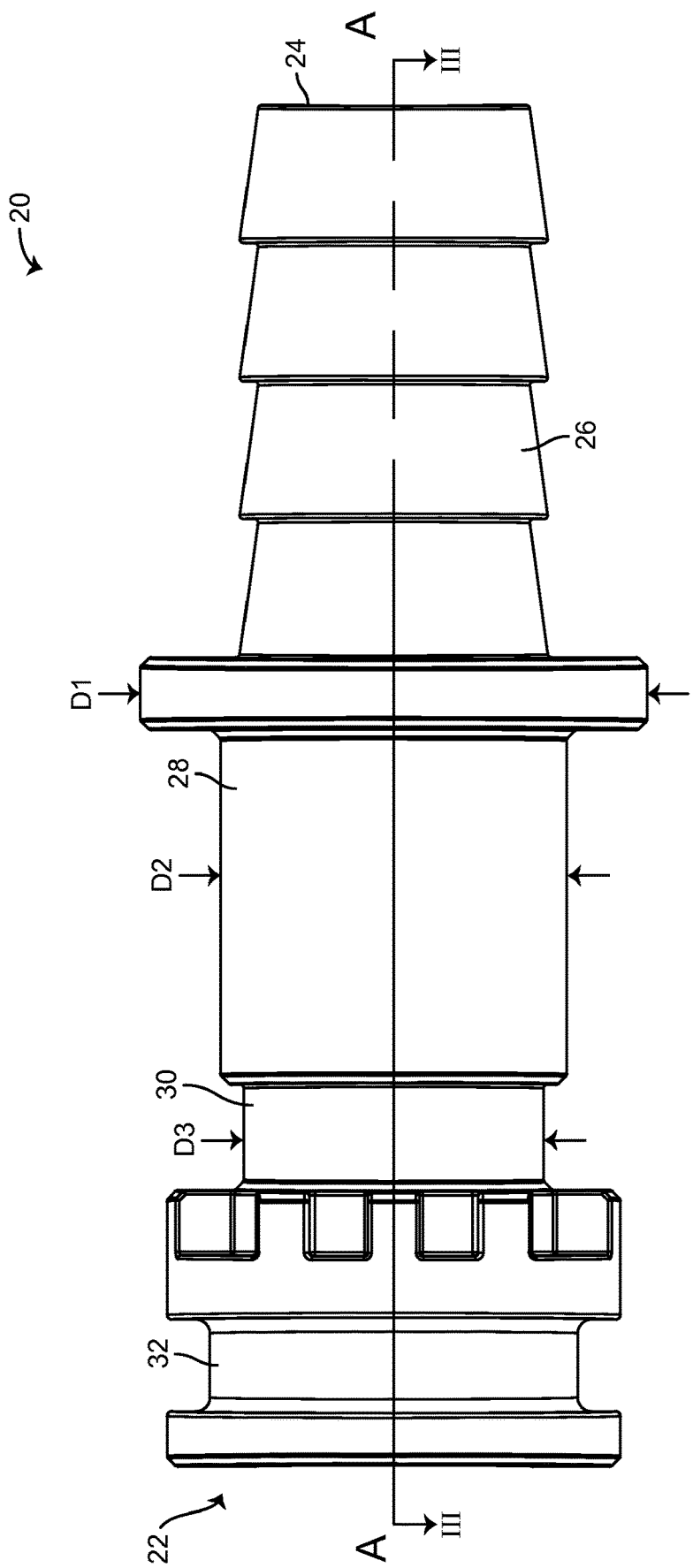
FIG. 3 is an elevation view of a fitting of the quick connect assembly of FIG. 1, shown according to an exemplary embodiment.
Figure 4:
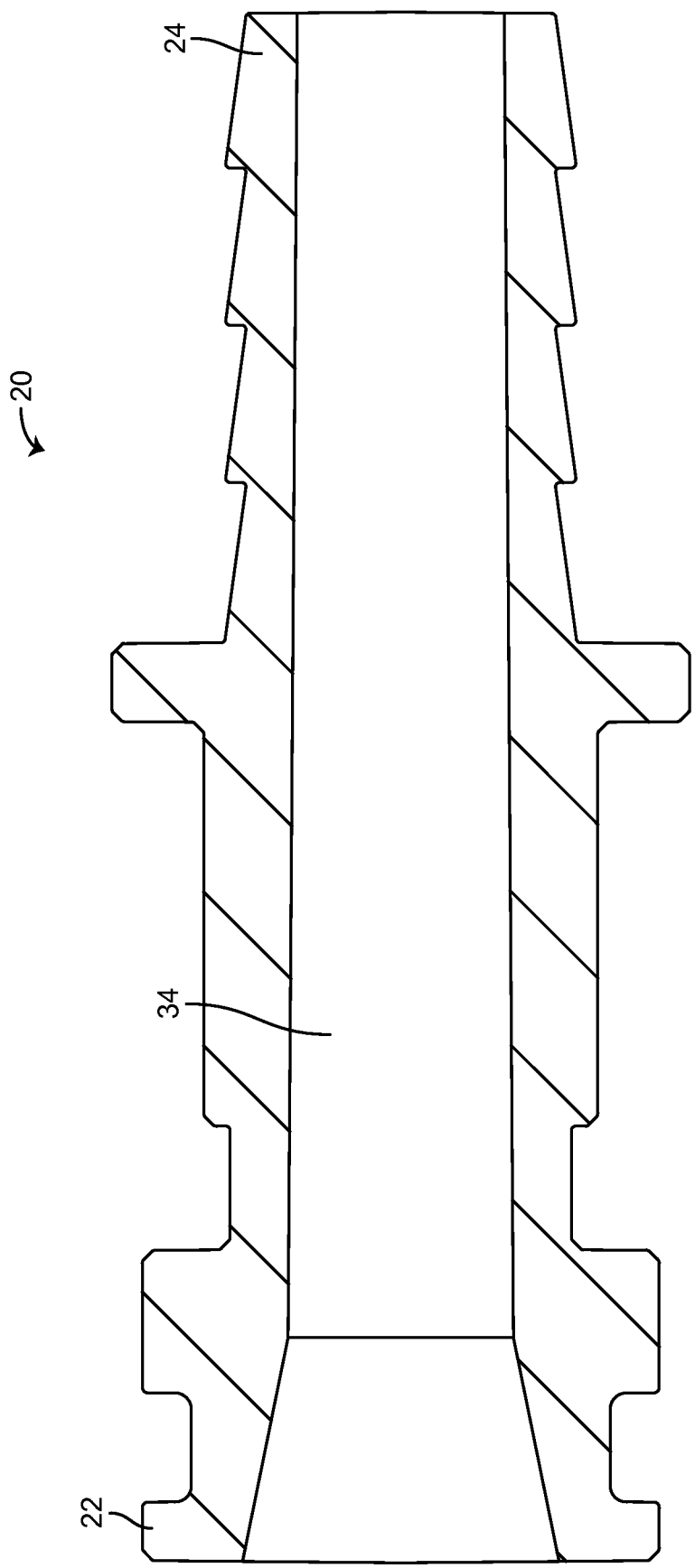
FIG. 4 is a sectional elevation view of the fitting of FIG. 3, shown according to an exemplary embodiment.
Figure 5:
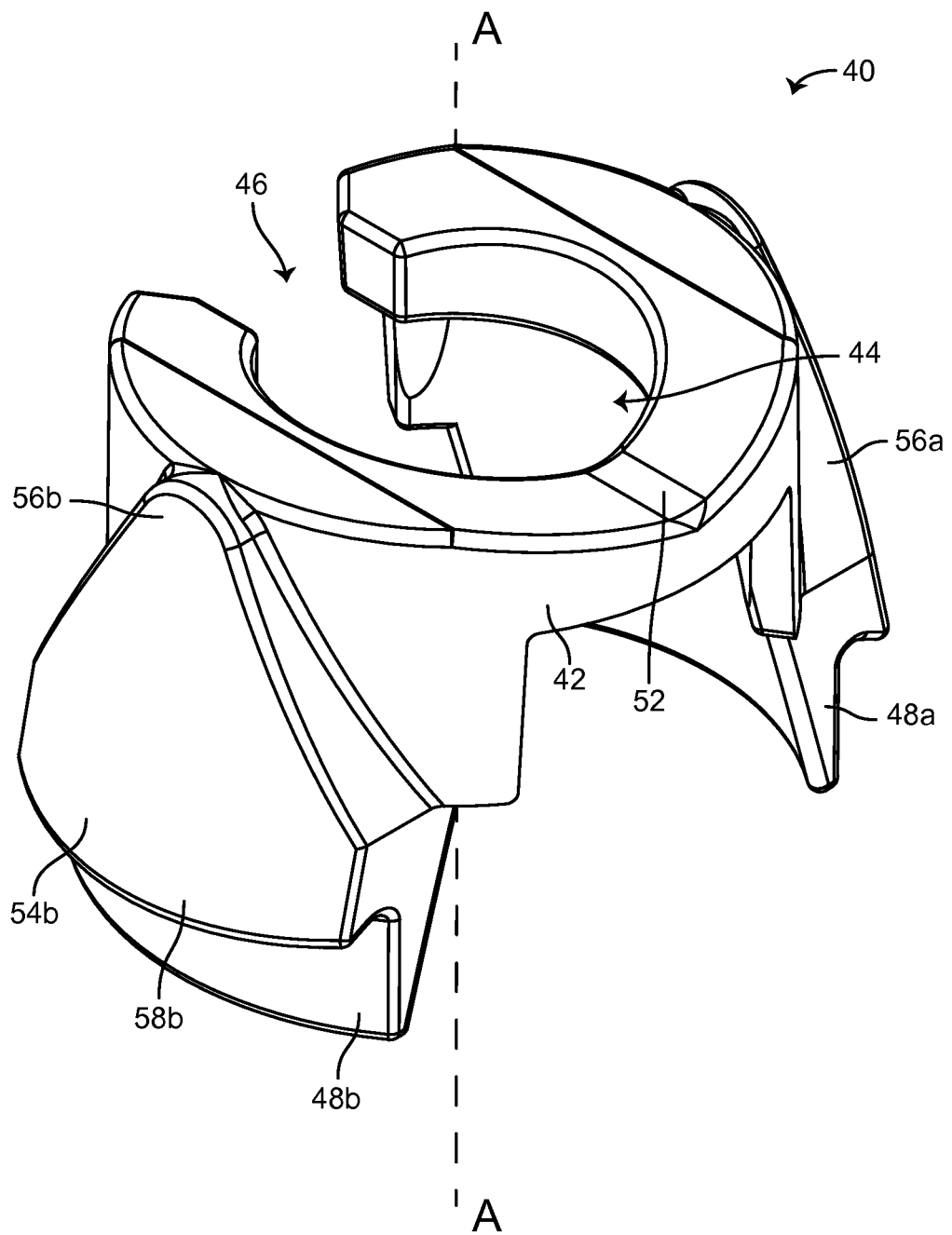
FIG. 5 is a perspective view of a clip of the quick connect assembly of FIG. 1, shown according to an exemplary embodiment.
Figure 6:
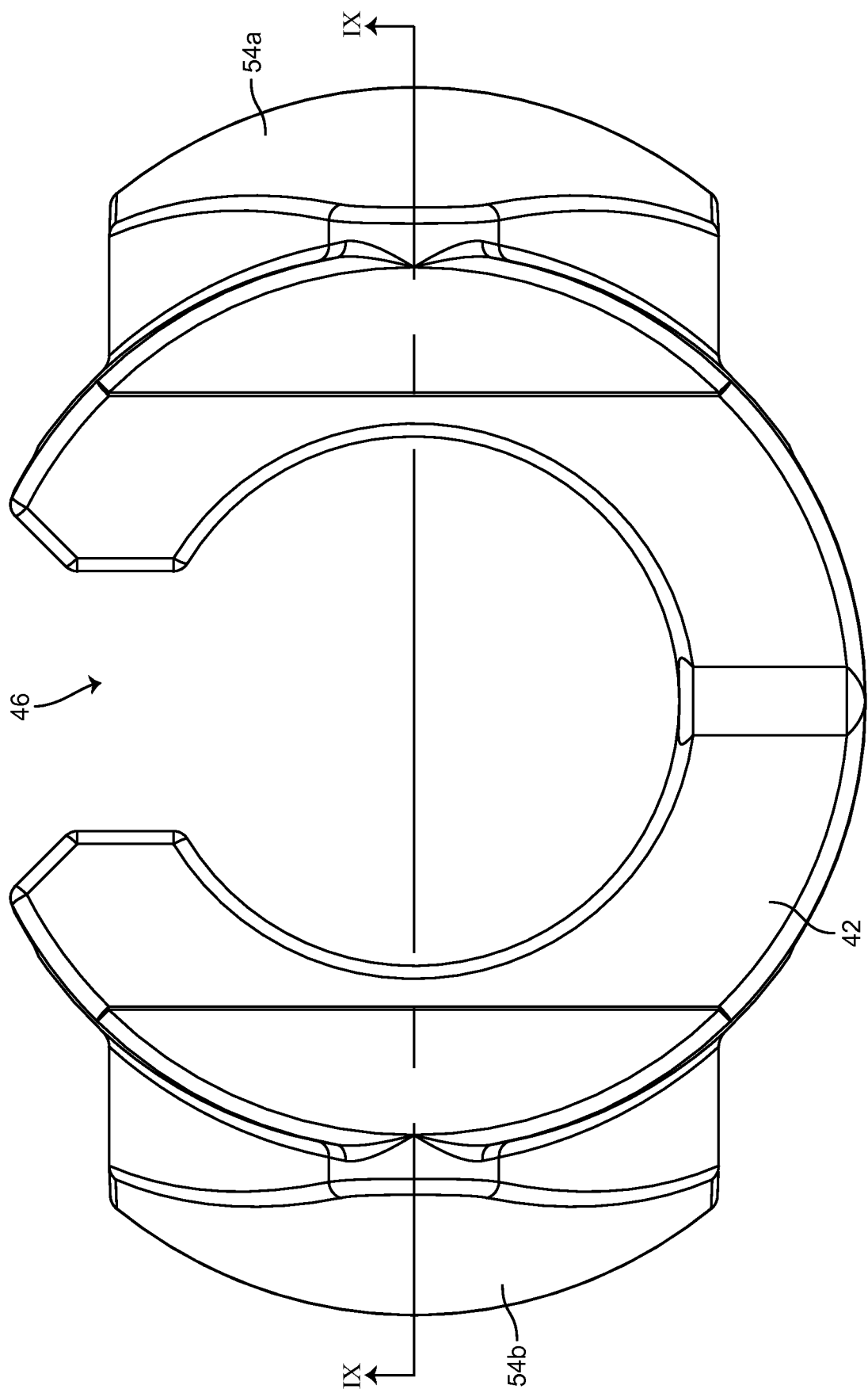
FIG. 6 is an axial plan view of the clip of FIG. 5, shown according to an exemplary embodiment.
Figure 7:
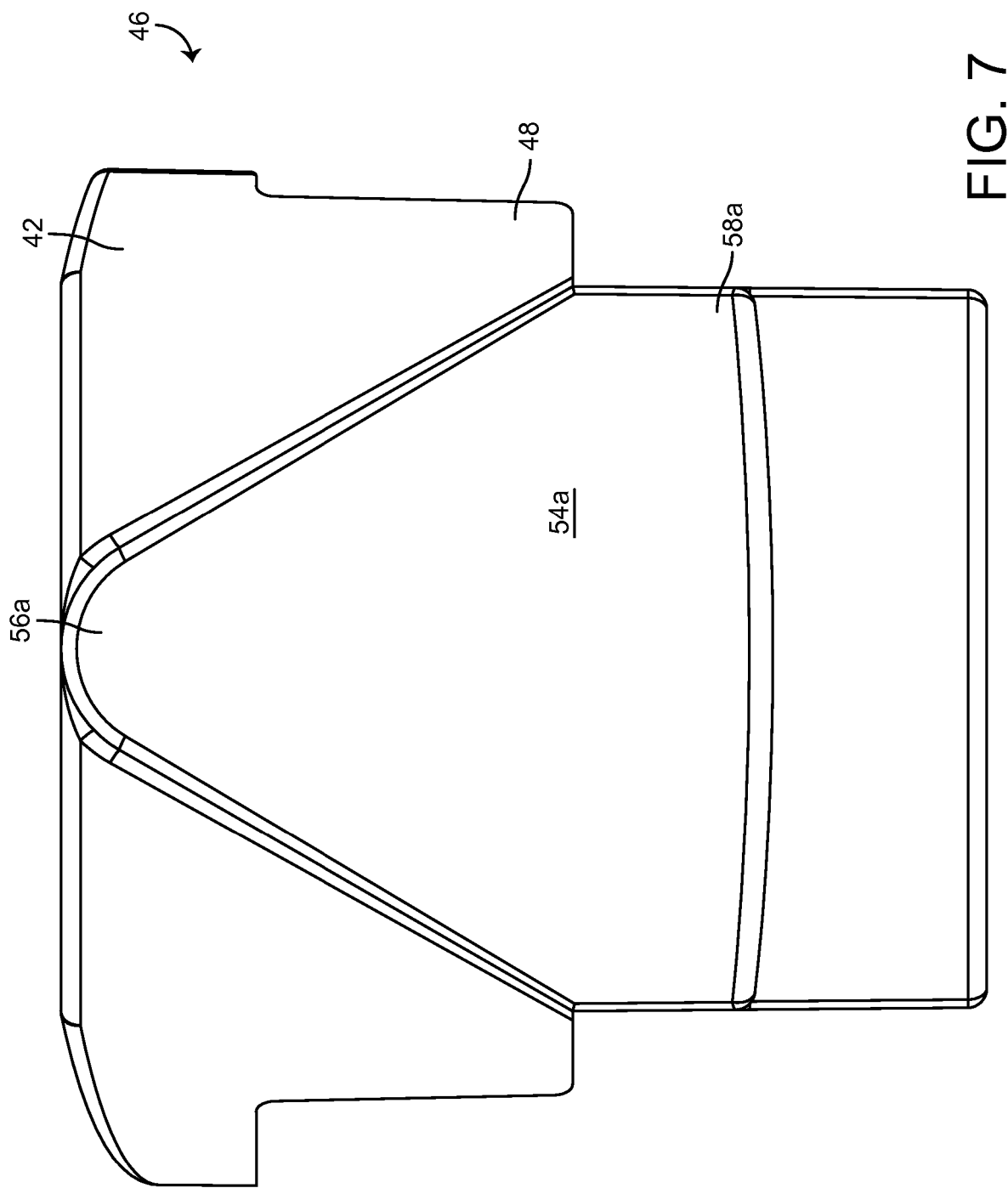
FIG. 7 is an elevation view of the clip of FIG. 5, shown according to an exemplary embodiment.
Figure 8:
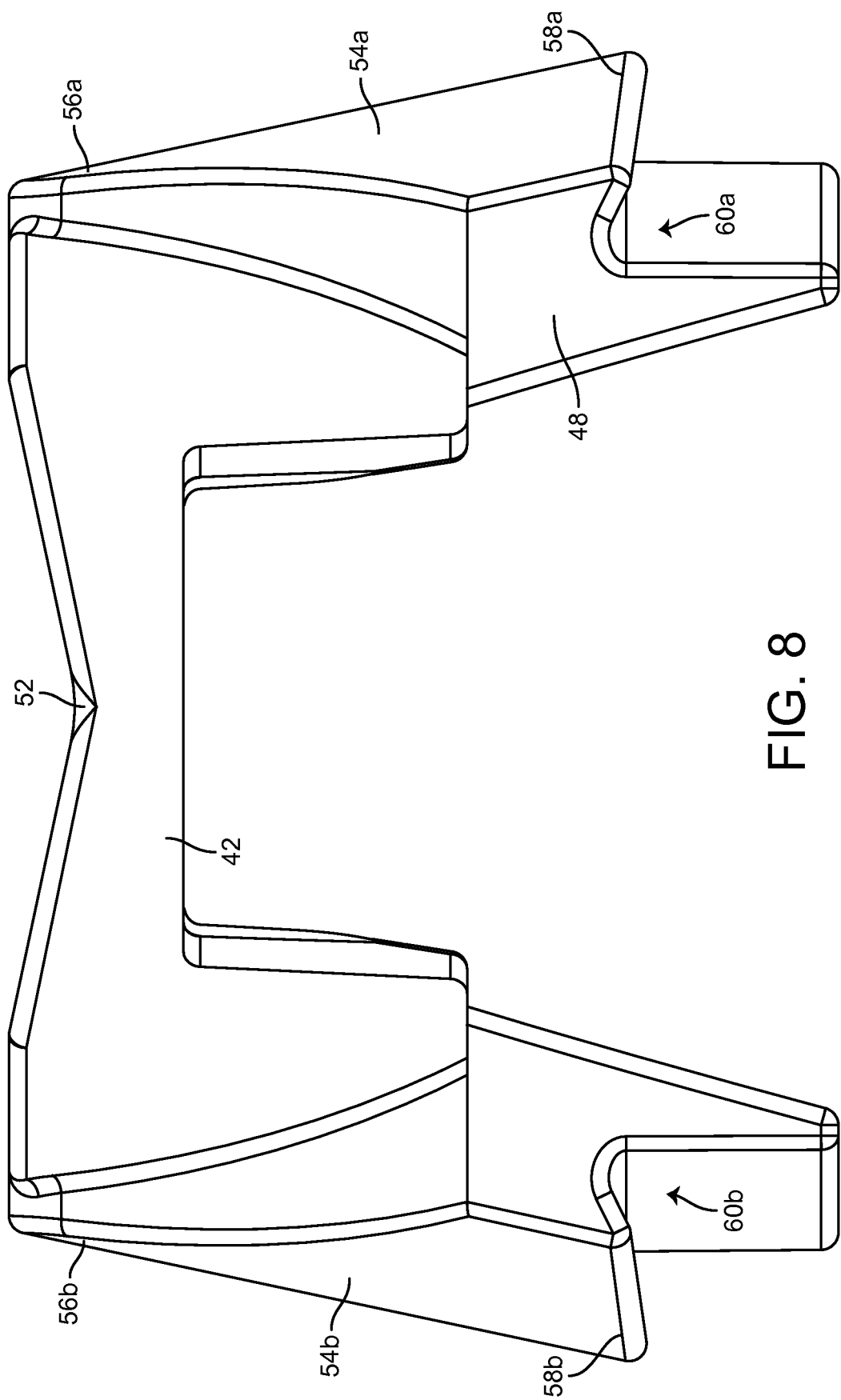
FIG. 8 is an elevation view of the clip of FIG. 5, shown according to an exemplary embodiment.
Figure 9:
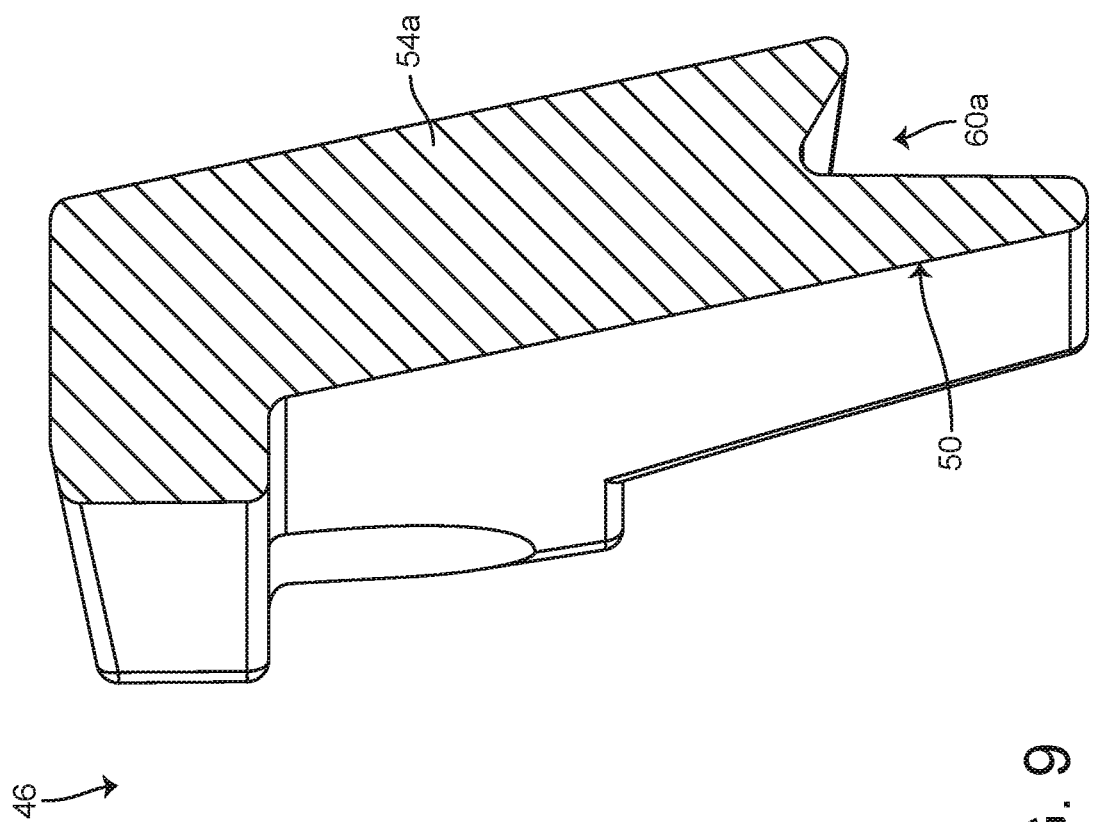
FIG. 9 is a sectional elevation view of the clip of FIG. 8, shown according to an exemplary embodiment.
Figure 9:
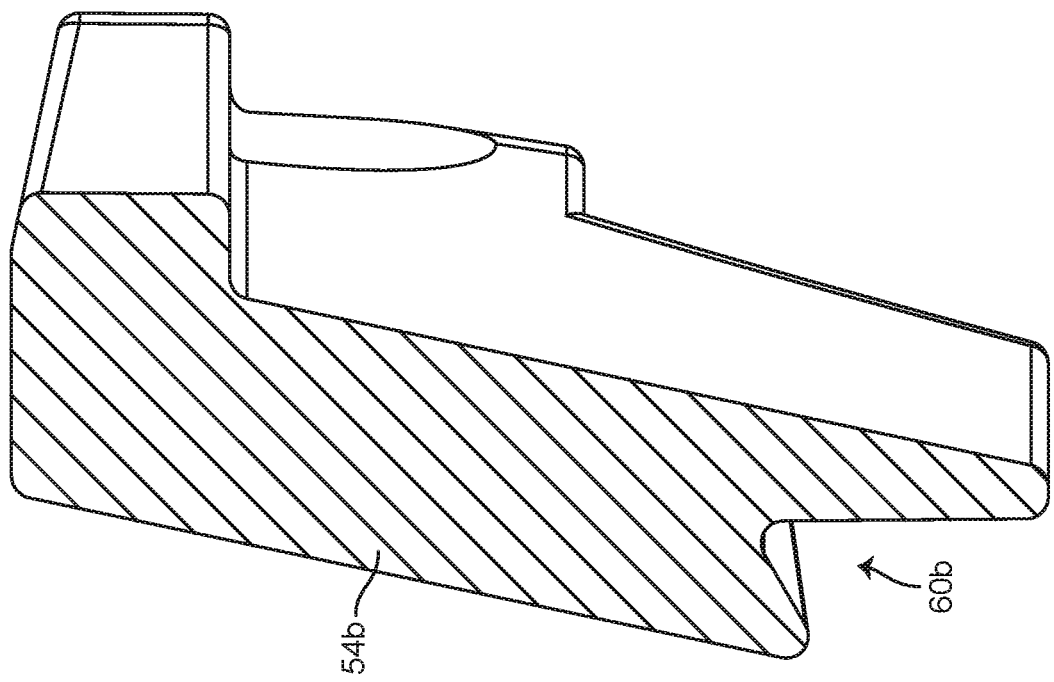

Referring to FIGS. 3 and 4, a fitting 20 is shown, according to an exemplary embodiment. The fitting 20 is shown to extend axially along an axis A and to include a first end 22 that is axially spaced from a second end 24 that is configured to be secured to the hose 12. For example, the second end 24 includes a plurality of barbs 26 over which the hose 12 may pass, and then a clamp 16 (see, e.g., FIG. 10) may be crimped onto the hose 12 and the fitting 20.

The fitting 20 has an outer periphery having a first diameter D1 and a recessed body portion 28 having a second diameter D2, which is less than the first diameter D1. The fitting 20 defines a first groove 30 (e.g., annular groove, slot, etc.) having a third diameter D3, which is less than the second diameter D2. The first groove 30 is shown to be annular. The fitting 20 is further shown to define a second groove 32 (e.g., annular groove, slot, etc.) located between the first groove 30 and the first end 22. The second groove 32 is configured to receive a seal 14 (e.g., o-ring, sealing element, etc.). A passageway 34 (e.g., bore, hole, etc.) configured to permit fluid to flow through the fitting 20 extends axially through the fitting 20. The fitting 20 may be made of any suitable material. For example, the fitting 20 may be made of metal, brass, stainless steel, composite, plastic, polyphenylsulfate, etc.

Referring to FIGS. 5-9, a clip 40 is shown, according to an exemplary embodiment. The clip 40 includes a base 42 through which axis A is shown to pass. According to the exemplary embodiment shown, the base 42 has a "C" shape that extends circumferentially substantially around the axis A. The base 42 defines an opening 44 and a gap 46 extending radially from the opening 44 through the base 42. The diameter D3 of the fitting 20 at the first groove 30 and the base 42 are configured to allow the fitting 20 to be forced through the gap 46 and be retained in the opening 44 of the clip 40. Accordingly, the clip 40 may be snapped onto the fitting 20. Further, the axial length of the first groove 30 is shown to be similar to the thickness of the base 42, thus limiting axial movement of the clip 40 when coupled to the fitting 20. According to another embodiment, the base 42 may be of other suitable shapes. For example, the base 42 may extend fully around the fitting 20. The clip 40 may be formed of any suitable material, e.g., metal, plastic, polyoxymethylene, etc.

According to the exemplary embodiment shown, the clip 40 includes a wing 48 (shown as a first wing 48a and a second wing 48b) that extends substantially axially from the base 42. According to the exemplary embodiment shown, the first wing 48a and the second wing 48b are radially or diametrically opposite one another. Briefly referring to FIGS. 8 and 9, an inner surface 50 of the wings 48 extend radially outward as the wings 48 extend axially from the base 42. Accordingly, when the wings 48 are forced radially towards one another, the wings 48 do not interfere with the fitting 20. Further, the thickness of the base 42 is shown to decrease to a minimum 52 between the wings 48, thereby facilitating flexing of the base 42 when the wings 48 are forced radially together. Accordingly, when the first and second wings 48a, 48b are pushed towards one another (e.g., squeezed), the wings 48 resiliently deflect towards one another. While the exemplary embodiment is shown to have two wings 48, it is contemplated that the clip 40 may have one, three, or more wings 48.

A lug 54 (shown as a first lug 54a and a second lug 54b) extends radially from each of the wings 48. According to the embodiment shown, the lugs 54 have a delta shape having a narrow end 56 proximate the base 42 and a broad end 58 distal the base 42. Briefly referring to FIGS. 7 and 8, the end of the lug 54 that is distal the base 42 (e.g., the broad end 58) extends radially and axially away from the wing 48 so as to define an undercut 60.

Figure 10:
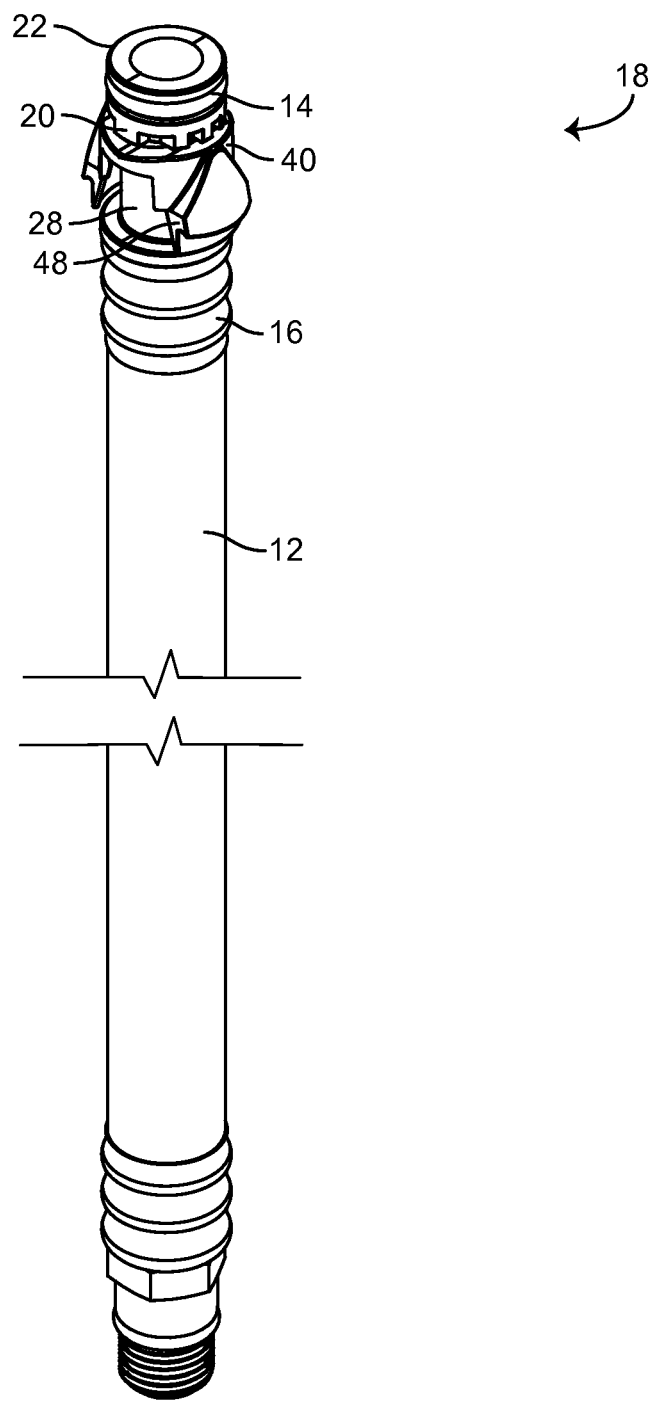
FIG. 10 is a perspective view of a male assembly of the quick connect assembly of FIG. 1, shown according to an exemplary embodiment.
Figure 11:
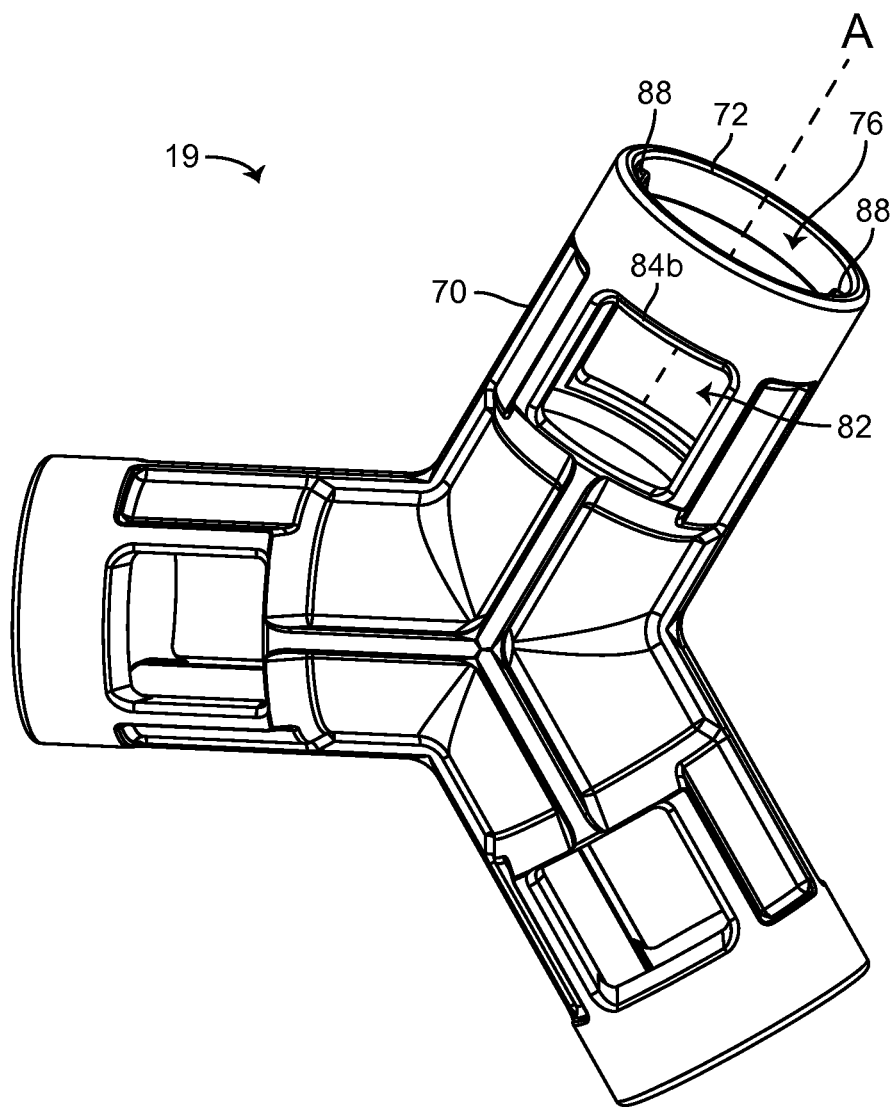
FIG. 11 is a perspective view of a female assembly of the quick connect assembly of FIG. 1, shown according to an exemplary embodiment.
Figure 12:
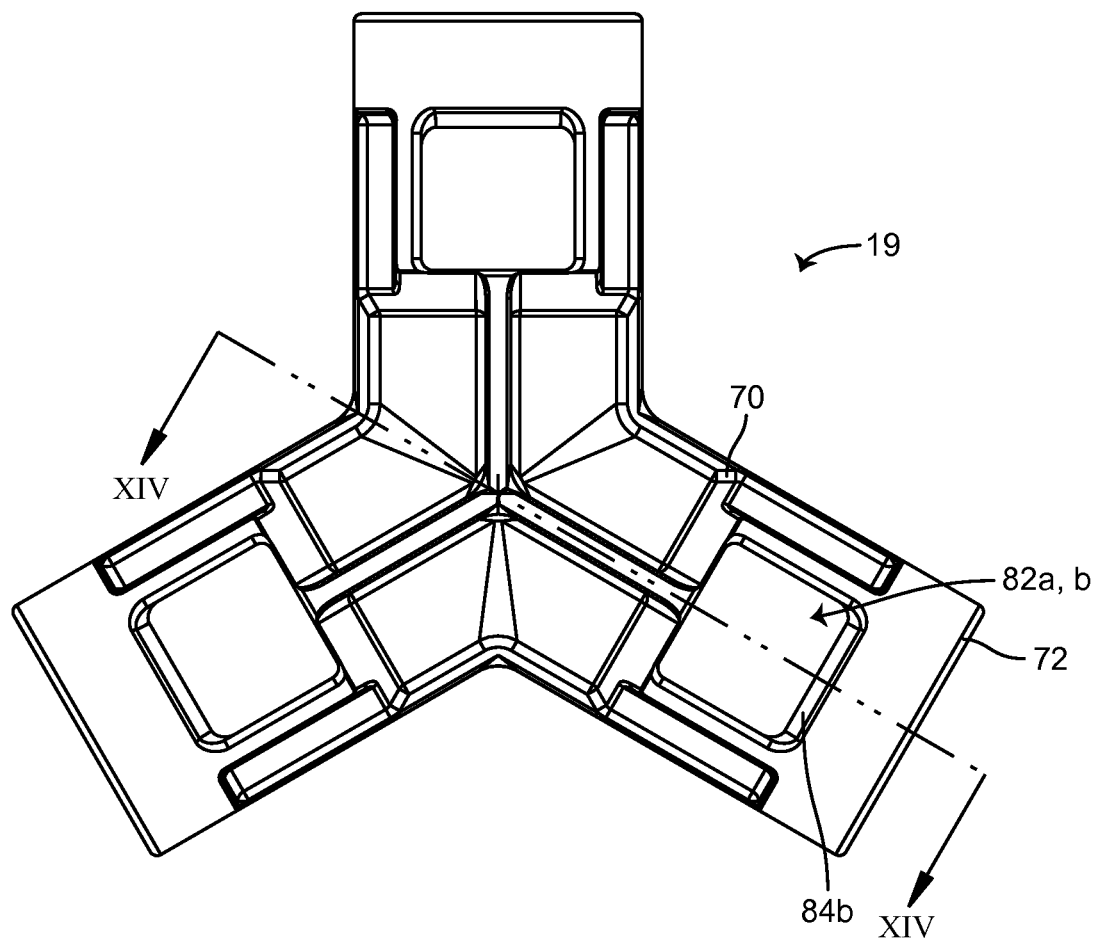
FIG. 12 is an elevation view of the female assembly of FIG. 11, shown according to an exemplary embodiment.

Referring to FIG. 10, a male assembly 18 is shown according to an exemplary embodiment. The male assembly 18 is shown to include the fitting 20 secured to the hose 12 via crimped clamp 16. The clip 40 is coupled to the fitting 20, and the wings 48 extend over the recessed body portion 28 of the fitting 20. The seal 14 is coupled to the fitting 20 between the first end 22 and the clip 40.

Referring to FIGS. 11-14, a female assembly 19 (shown as a Tee connector), is shown according to an exemplary embodiment. The female assembly 19 is shown to have three receivers 70, which are each configured to couple to a male assembly 18. According to other embodiments, the female assembly 19 may have a different number of receivers 70, and the other ends of the female assembly 19 may have a different type of connection (e.g., threaded, bayonet, friction, etc.). Further, as the male assemblies 18 may plug into multiple sides of the female assembly 19, it is contemplated that fluid may flow in either direction through the male assembly 18.

Figure 13:
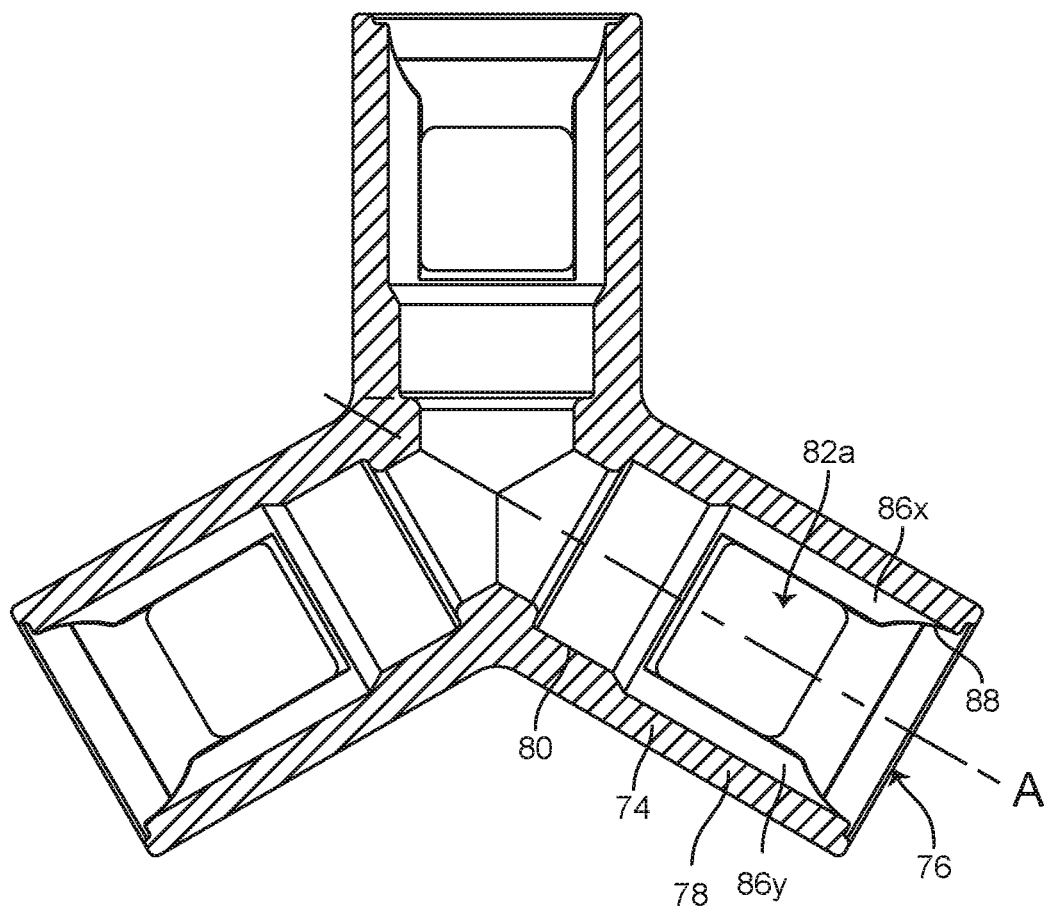
FIG. 13 is a sectional elevation view of the female assembly of FIG. 11, shown according to an exemplary embodiment.

The receiver 70 includes an end 72 and a sidewall 74 extending axially from the end 72. The sidewall 74 at least partially defines a bore 76. According to the exemplary embodiment (as best seen in FIG. 13), the sidewall 74 includes a first portion 78 that is proximal (e.g., nearer, closer, etc.) to the end 72 and a second portion 80 that is distal (e.g., farther) from the end 72. As shown, the second portion 80 has a narrower diameter than the first portion 78. When the clip 40 is in the installed position, the seal 14 seals (e.g., sealingly engages) between the fitting 20 and the second portion 80 of the sidewall 74.

Figure 14:
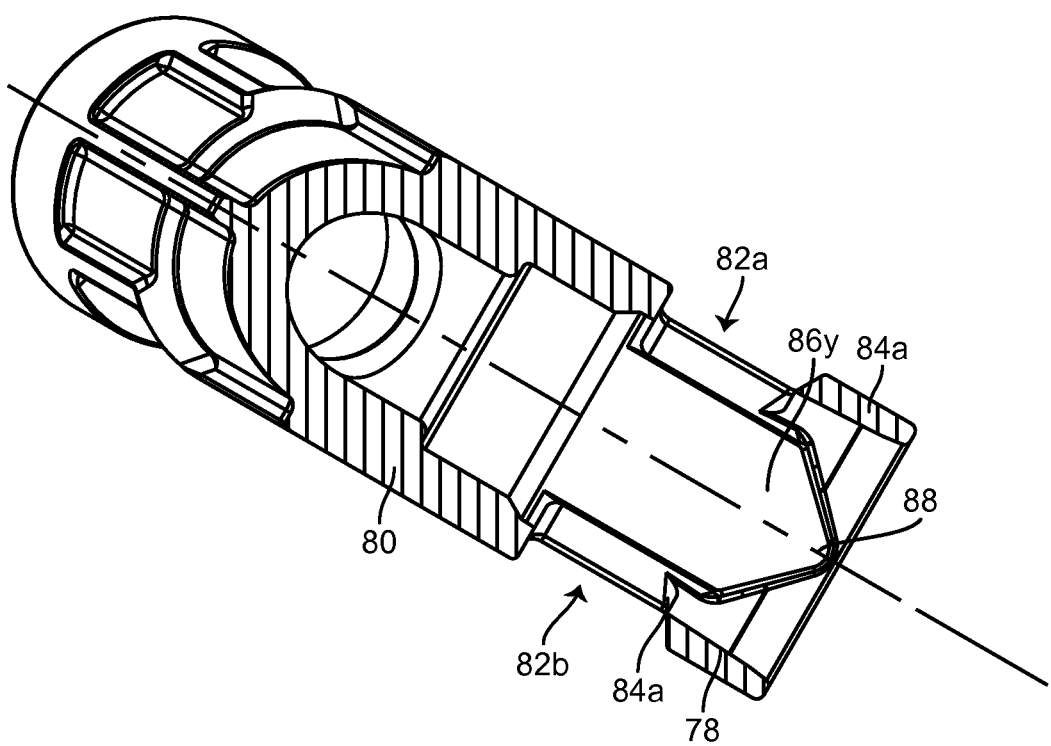
FIG. 14 is a sectional elevation view of the female assembly of FIG. 11, shown according to an exemplary embodiment.

An aperture 82 (show as first aperture 82a and second aperture 82b) passes from the bore 76 through the sidewall 74. According to the embodiment shown, the aperture 82 is defined by the sidewall 74 and a lip 84, and the aperture 82 passes radially outwardly through the sidewall 74. Referring briefly to FIG. 14, the lip 84 extends outwardly from the bore 76 toward the end 72.

When the clip 40 is in an installed position (see, e.g., FIGS. 1 and 2), the lug 54 extends at least partially through the aperture 82. According to the exemplary embodiment shown, the first lug 54a at least partially extends through the first aperture 82a, the second lug 54b at least partially extends through the second aperture 82b, and the lips 84a, 84b are seated in the respective undercuts 60a, 60b. Accordingly, when the clip 40 is in the installed position, axial force trying to push the clip 40 out of the receiver 70 (e.g., water pressure in the quick connect assembly 10, pulling on hose 12, etc.) will force the lip 84 into the undercut 60, thereby preventing the quick connect assembly 10 from disassembling. Thus, the quick connect assembly 10 inhibits a user from uncoupling the clip 40 and the receiver 70 before fluid pressure has been relieved from the system (e.g., hose 12 has been drained).

The receiver 70 is further shown to include a guide 86 (shown as a first guide 86x and a second guide 86y) extending radially inward from the sidewall 74 into the bore 76. The guide 86 is configured to rotationally urge the lug 54 toward the aperture 82 as the clip 40 is moved from an uninstalled position to the installed position. As shown, the guide 86 includes a narrower end 88 that is closer (e.g., nearer, proximal, etc.) to the end 72 of the receiver 70 and includes a broader end farther (e.g., distal, etc.) from the end 72 of the receiver 70. Accordingly, as the clip 40 is moved from the uninstalled position to the installed position, the guide 86 rotates the clip 40 in response to the axial force, thereby orienting the lug 54 to the aperture 82. According to the exemplary embodiment shown, the first guide 86x and the second guide 86y are located radially opposite one another, and both the first guide 86x and the second guide 86y are located substantially orthogonal to the first aperture 82a and the second aperture 82b. According to one embodiment, the plurality of lugs 54 and the plurality of apertures 82 are evenly spaced around axis A. Thus, each lug 54 is guided to an aperture 82 in response to axial force, without the user needing to actively or consciously try to orient the lugs 54 and the apertures 82.

Assembly and installation of the quick connect assembly 10 will now be described according to an exemplary embodiment, with reference to the exemplary embodiment shown in the figures. The fitting 20 is coupled to hose 12. The second end 24 of the fitting 20 is inserted into the hose 12, and the clamp 16 is crimped over the hose 12 and barbs 26 to secure the fitting 20 to the hose 12. The base 42 of the clip 40 is coupled to the fitting 20 by inserting the base 42 into the first groove 30. A seal 14 is seated into the second groove 32.

The male assembly 18 is then inserted into the female assembly 19. The first end 22 of the fitting 20 is pushed axially (e.g., positive axial force) into the bore 76 of the receiver 70, past the end 72 of the receiver 70. The narrow end 56 of the lug 54 will end up on one side (e.g., left or right, clockwise or counterclockwise, etc.) or the other (e.g., right or left, counterclockwise or clockwise, etc.) of the narrower end 88 of the guide 86. Which side the narrow end 56 ends up on is not necessarily important in the embodiment shown; however, the general narrowness of the narrow end 56 and the narrower end 88 facilitates the two ends 56, 88 being offset from one another and reduces the chance that the two ends 56, 88 will end up abutting one another in a stalemate. As the male assembly 18 is further forced axially into the receiver 70, the angled interfaces of the guide 86 and the lug 54 cause the clip 40 to rotate such that the lugs 54 are guided to the apertures 82.

As the clip 40 is installed into the receiver 70, the wings 48 are deflected radially toward one another by the sidewall 74. As described above, the angled inner surface 50 of the wing 48 and the reduced diameter D2 of the recessed body portion 28 allow the clip 40 to deflect (e.g., flex, collapse, etc.) to at least partially within the outer periphery of the fitting 20, thereby facilitating insertion of the clip 40 into the receiver 70.

When the lugs 54 axially and rotationally reach the apertures 82, the clip 40 and the wings 48 resiliently return to a relaxed state, and the lugs 54 at least partially extend through the apertures 82. Contact between components may cause an audible noise (e.g., a click) or may cause a tactile or haptic feeling that is/are observable by the user to communicate that the wings 48 have returned to the relaxed state and/or that the lugs 54 have at least partially extended through the apertures 82. A negative axial force may be applied to the male assembly 18 (e.g., by pulling on the hose 12, by creating fluid pressure in the quick connect assembly 10, etc.). The negative axial force causes the lips 84 to seat into the undercuts 60. The clip 40 is in an installed position, and during installation, the seal 14 has sealingly engaged the sidewall 74, creating a sealed fluid pathway through the quick connect assembly 10.

Disconnection of the quick connect assembly 10 will now be described according to an exemplary embodiment. According to an exemplary embodiment, fluid flow to the quick connect assembly 10 should be stopped, and fluid pressure in the quick connect assembly 10 should be relieved. The lips 84 are unseated from the undercuts 60 by moving the clip 40 in a positive axial direction (e.g., further into the bore 76, etc.). The angles of the undercut 60 and the lip 84 are configured to transfer radial forces into axial forces. For example, a user may squeeze (e.g., apply a compressive force) the lugs 54 together (e.g., toward one another), and the interface of the undercut 60 and the lip 84 causes at least some of the force to be transferred into a positive axial force. When the broad end 58 of the lug 54 has moved over the lip 84, the clip 40 and/or the wings 48 may deflect such that the lugs 54 may move radially to within the bore 76. When the components of the clip 40 are within the bore 76, the clip 40 may be moved axially (e.g., negative axial force) toward the end 72 of the receiver 70 and out of the receiver 70. For example, the male assembly 18 may be withdrawn from the receiver 70 by pulling on the hose 12.

The construction and arrangement of the elements of the quick connect assembly as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A quick connect system for a fluid coupling, the system comprising:
   a clip having:
      a base extending circumferentially substantially around an axis;
      a wing extending substantially axially from the base; and
      a delta-shaped lug extending radially from the wing and comprising a narrow end proximate the base, a broad end distal the base, and side edges that extend from the broad end of the delta-shaped lug to the narrow end of the delta-shaped lug and converge with each other to form a corner of the delta-shaped lug at the narrow end of the delta-shaped lug; and
   a receiver having:
      an end;
      a sidewall at least partially defining a bore extending axially from the end;
      an aperture passing radially from the bore through the sidewall; and
      a guide extending from the sidewall into the bore, the guide comprising a narrow end proximate the end of the receiver, a broad end distal the end of the receiver, and side edges that extend from the broad end of the guide to the narrow end of the guide and converge with each other to form a corner of the guide at the narrow end of the guide,
   wherein the guide extends axially past the aperture to the end and is configured to interface with the delta-shaped lug to rotationally urge the delta-shaped lug toward the aperture as the clip is moved from an uninstalled position to an installed position, thereby orienting the delta-shaped lug to the aperture when the clip is inserted into the receiver in substantially any orientation in which the narrow end of the delta-shaped lug is offset from the narrow end of the guide;
   wherein the corner of the delta-shaped lug and the corner of the guide facilitate the narrow end of the delta-shaped lug being offset from the narrow end of the guide when the clip is inserted into the receiver.

2. The system of claim 1, wherein the wing is a first wing, the system further comprising:
a second wing extending substantially axially from the base diametrically opposite the first wing; and
a second delta-shaped lug extending radially from the second wing;
wherein the clip is configured such that the first wing and the second wing are capable of resiliently deflecting towards one another.

3. The system of claim 1, wherein the base of the clip has a "C" shape defining a central opening and a gap extending radially from the opening through the base.

4. The system of claim 3 further comprising an axially extending fitting configured to be secured to a fluid conduit, the fitting defining an annular groove;
wherein a diameter of the fitting at the annular groove and the base of the clip are configured to allow the fitting to be forced through the gap and be retained in the central opening of the clip.

5. The system of claim 1, wherein the broad end of the lug extends radially and axially away from the wing so as to define an undercut.

6. The system of claim 1, wherein, when the clip is in the installed position, the lug extends at least partially through the aperture.

7. A quick connect system for a fluid coupling, the system comprising:
an axially extending fitting configured to be secured to a fluid conduit;
a receiver having:
an end;
a sidewall at least partially defining a bore extending axially from the end; and
a lip at least partially defining an aperture passing radially from the bore through the sidewall, the lip extending outwardly from the bore toward the end; and
a guide extending from the sidewall into the bore, the guide comprising a narrow end proximate the end of the receiver, a broad end distal the end of the receiver, and side edges that extend from the broad end of the guide to the narrow end of the guide and converge with each other to form a corner of the guide at the narrow end of the guide; and
a clip coupled to the fitting and having:
a base;
a first wing extending substantially axially from the base; and
a first lug extending radially from the first wing and comprising a narrow end proximate the base, a broad end distal the base, and side edges that extend from the broad end of the first lug to the narrow end of the first lug and converge with each other to form a corner of the first lug at the narrow end of the first lug, wherein the broad end of the first lug extends radially and axially away from the first wing so as to define an undercut;
wherein, when the clip is in an installed position, the first lug extends at least partially through the aperture, and the lip is seated in the undercut,
wherein the guide extends axially past the aperture to the end and is configured to interface with the first lug to rotationally urge the first lug toward the aperture as the clip is moved from an uninstalled position to the installed position, thereby orienting the first lug to the aperture when the clip is inserted into the receiver in substantially any orientation in which the narrow end of the first lug is offset from the narrow end of the guide, wherein the corner of the first lug and the corner of the guide facilitate the narrow end of the first lug being offset from the narrow end of the guide when the clip is inserted into the receiver.

8. The system of claim 7, wherein:
the fitting comprises a first end, a second end axially spaced from the first end, and an annular groove located between the first end and the second end; and
the base of the clip defines an opening such that the base of the clip is seated in the annular groove.

9. The system of claim 8, wherein the second end of the fitting is configured to be secured to the fluid conduit, and wherein the annular groove is a first groove and the fitting defines a second annular groove between the first groove and the first end; and
further comprising a seal seated in the second groove, wherein, when the clip is in the installed position, the seal seals between the fitting and the sidewall.

10. The system of claim 8, wherein the base of the clip has a "C" shape extending circumferentially substantially about an axis and defining the opening and a gap extending radially from the opening through the base.

11. The system of claim 7 further comprising a second wing extending substantially axially from the base diametrically opposite the first wing;
wherein the clip is configured such that the first wing and the second wing are capable of resiliently deflecting radially towards one another.

12. The system of claim 11, wherein to move the clip from the installed position to the uninstalled position, the clip moves axially away from the end to unseat the lip from the undercut, the first and second wings deflect radially toward one another such that the lugs are within the bore, and the clip moves axially toward the end and out of the receiver.

13. The system of claim 7, wherein the first lug comprises a delta-shape.

14. A quick connect system for a fluid coupling, the system comprising:
an axially extending fitting configured to be secured to a fluid conduit;
a receiver having:
an end;
a sidewall at least partially defining a bore extending axially from the end and defining an aperture passing outwardly from the bore through the sidewall; and
a guide extending from the sidewall into the bore, the guide comprising a narrow end proximate the end of the receiver, a broad end distal the end of the receiver, and side edges that extend from the broad end of the guide to the narrow end of the guide and converge with each other to form a corner of the guide at the narrow end of the guide; and
a clip coupled to the fitting and having:
a base;
a first wing extending substantially axially from the base; and
a first lug extending radially from the first wing and comprising a narrow end proximate the base, a broad end distal the base, and side edges that extend from the broad end of the first lug to the narrow end of the first lug and converge with each other to form a corner of the first lug at the narrow end of the first lug,
wherein the guide extends axially past the aperture to the end and is configured to interface with the first lug to rotationally urge the first lug toward the aperture as the clip is moved from an uninstalled position to an installed position, thereby orienting the first lug to the aperture when the clip is inserted into the receiver in substantially any orientation in which the narrow end of the first lug is offset from the narrow end of the guide, wherein the corner of the first lug and the corner of the guide facilitate the narrow end of the first lug being offset from the narrow end of the guide when the clip is inserted into the receiver.

15. The system of claim 14, wherein the first lug comprises a delta-shape.

16. The system of claim 14 further comprising a second wing extending substantially axially from the base radially opposite the first wing;

wherein the clip is configured such that the first wing and the second wing are configured to resiliently deflect radially towards one another.

17. The system of claim 16, wherein:

the receiver comprises a second guide extending from the sidewall into the bore, the second guide located radially opposite the first guide;

the receiver defines a second aperture radially opposite the first aperture and is configured to receive a second lug when the clip is in the installed position; and the first guide and the second guide are oriented substantially orthogonally to the first aperture and the second aperture.

18. The system of claim 14, wherein:

the broad end of the first lug extends radially and axially away from the first wing so as to define an undercut;

the sidewall includes a lip that at least partially defines the aperture, the lip extending outwardly from the bore toward the end; and when the clip is in the installed position, the first lug extends at least partially through the aperture, and the lip is seated in the undercut.

19. The system of claim 14, wherein:

the fitting has an outer periphery having a first diameter, a recessed body portion having a second diameter less than the first diameter, and an annular groove having a third diameter less than the second diameter; and the base of the clip is seated in the annular groove such that the first wing extends over the recessed body portion.

* * * * *